(12) United States Patent
Bogner et al.

(10) Patent No.: US 8,131,771 B2
(45) Date of Patent: *Mar. 6, 2012

(54) METHOD AND COMPUTER PROGRAM PRODUCT FOR DYNAMIC WEIGHTING OF AN ONTOLOGICAL DATA MODEL

(75) Inventors: Matthew R. Bogner, Austin, TX (US); Belinda Y. Chang, Naperville, IL (US); Robert R. Cutlip, Cary, NC (US); Kevin Grigorenko, Trevose, PA (US)

(73) Assignee: International Business Machines Corporation, Armonk, NY (US)

( * ) Notice: Subject to any disclaimer, the term of this patent is extended or adjusted under 35 U.S.C. 154(b) by 729 days.

This patent is subject to a terminal disclaimer.

(21) Appl. No.: 12/120,466

(22) Filed: May 14, 2008

(65) Prior Publication Data

US 2008/0256134 A1 Oct. 16, 2008

Related U.S. Application Data

(63) Continuation of application No. 11/067,341, filed on Feb. 25, 2005, now Pat. No. 7,392,258.

(51) Int. Cl.
*G06F 17/20* (2006.01)
*G06F 15/16* (2006.01)
(52) U.S. Cl. ........................ 707/798; 707/797
(58) Field of Classification Search .......... 707/798, 707/797
See application file for complete search history.

(56) References Cited

U.S. PATENT DOCUMENTS

| | | | |
|---|---|---|---|
| 5,627,973 A | 5/1997 | Armstrong et al. | |
| 5,630,069 A | 5/1997 | Flores et al. | |
| 5,734,837 A | 3/1998 | Flores et al. | |

(Continued)

OTHER PUBLICATIONS

"Wait activities in workflow management systems", IBM Corp., Research Disclosure, Apr. 2000, pp. 794-795.

(Continued)

*Primary Examiner* — Giovanna Colan
*Assistant Examiner* — Alex Gofman
(74) *Attorney, Agent, or Firm* — Steven M. Greenberg, Esq.; Carey, Rodriguez, Greenberg & O'Keefe

(57) ABSTRACT

A method, computer program product, and a data processing system that facilitates navigation through a directed graph for selection of sub-processes of a modified business process derived from a business process is provided. A bounding box is used for evaluating and selecting sequences of nodes representative of business sub-processes or services. The bounding box has a predefined depth for limiting the scope of the evaluation. The bounding box is shifted during the evaluation as sequences of nodes are selected. Additionally, state data is maintained such that a sense response model may be employed to detect and account for changes to the environment in previously evaluated services. By maintaining state data, a transition to a previously evaluated sub-process may be implemented to account for significant changes in the environment.

11 Claims, 12 Drawing Sheets

U.S. PATENT DOCUMENTS

| | | | |
|---|---|---|---|
| 6,038,538 | A | 3/2000 | Agrawal et al. |
| 6,064,953 | A | 5/2000 | Maxwell, III et al. |
| 6,112,203 | A * | 8/2000 | Bharat et al. ............ 1/1 |
| 6,289,353 | B1 * | 9/2001 | Hazlehurst et al. ............ 1/1 |
| 6,347,256 | B1 | 2/2002 | Smirnov et al. |
| 6,631,354 | B1 | 10/2003 | Leymann et al. |
| 6,636,800 | B1 | 10/2003 | Lauther et al. |
| 6,721,759 | B1 | 4/2004 | Rising, III |
| 2002/0055940 | A1 | 5/2002 | Elkan |
| 2004/0210552 | A1 | 10/2004 | Friedman et al. |
| 2006/0195330 | A1 | 8/2006 | Bogner et al. |
| 2006/0195332 | A1 | 8/2006 | Bogner et al. |

OTHER PUBLICATIONS

"User-controlled notification in workflow management systems", IBM Corp., Research Disclosure, Aug. 2000, pp. 1490-1491.

"Subprocess synchronization in workflow management systems", IBM Corp., Research Disclosure, Aug. 2000, pp. 1484-1487.

"Advanced container mapping in workflow management systems", IBM Corp., Research Disclosure, Feb. 2001, pp. 286-287.

"Post activities in workflow management systems", IBM Corp., Research Disclosure, Aug. 2000, pp. 1481-1482.

"Reconciliation of data flows in workflow management systems", IBM Corp., Research Disclosure, May 2000, pp. 939-941.

* cited by examiner

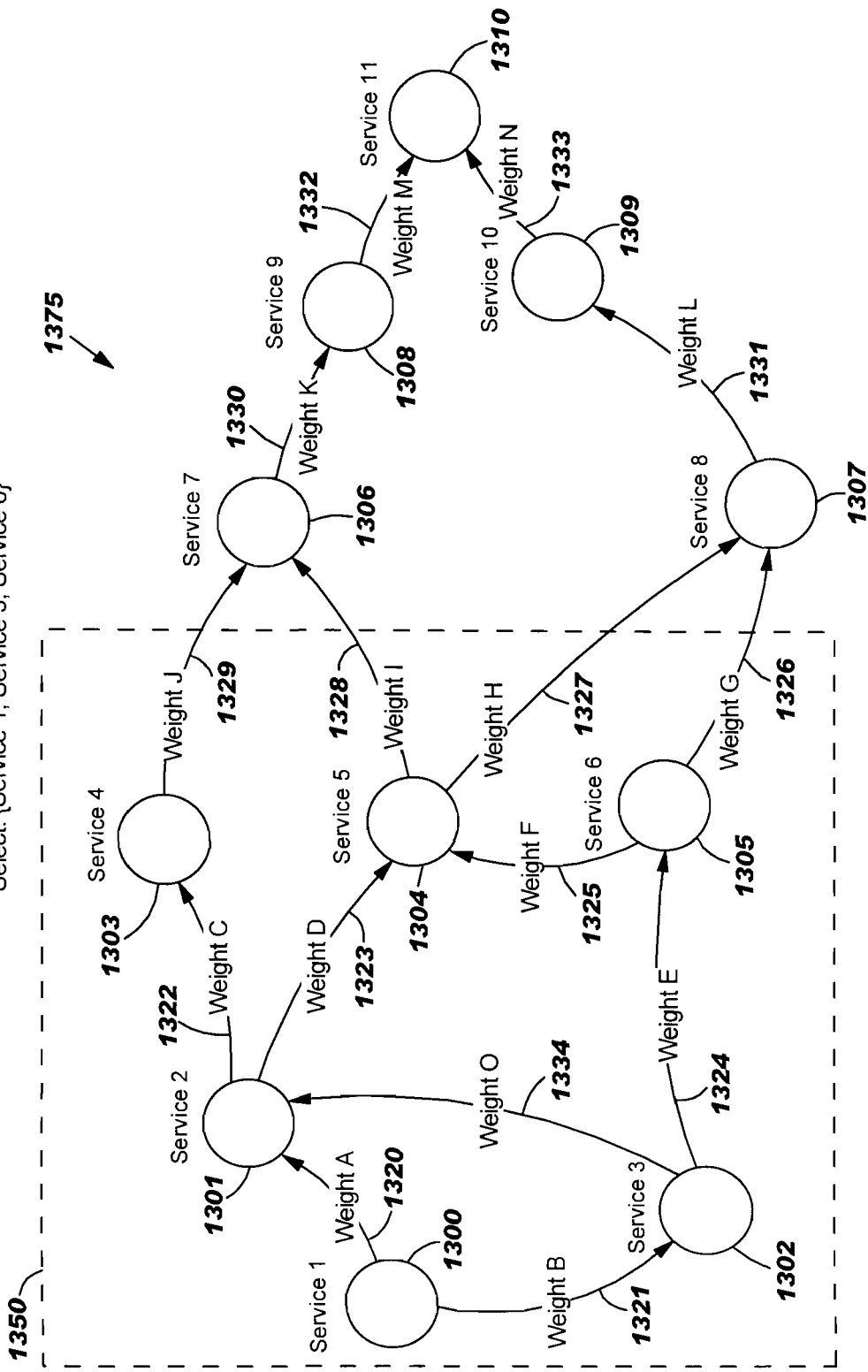

Select: {Service 1, Service 3, Service 6, Service 5, Service 7}

METHOD AND COMPUTER PROGRAM PRODUCT FOR DYNAMIC WEIGHTING OF AN ONTOLOGICAL DATA MODEL

This application is a continuation of application Ser. No. 11/067,341 filed Feb. 25, 2005, status, allowed.

CROSS-REFERENCE TO RELATED APPLICATIONS

This application is related to commonly assigned and co-pending U.S. patent application Ser. No. 11/067,861 entitled "Method and Computer Program Product for Enabling Dynamic and Adaptive Business Processes Through an Ontological Data Model"; and U.S. patent application Ser. No. 11/069,721 entitled "Method and Computer Program Product for Generating a Lightweight Ontological Data Model" all of which are hereby incorporated by reference.

BACKGROUND OF THE INVENTION

1. Technical Field

The present invention relates generally to an improved data processing system and in particular to a method of dynamic weighting on an onto-model. Still more particularly, the present invention provides a mechanism for weighting directed edges in an onto-model implemented as a directed graph.

2. Description of Related Art

Enterprise systems are increasingly integrating various business systems and processes to facilitate data collaboration among various software systems. Business processes may be implemented in a proprietary software language or may be implemented using an industry standard language, such as the Business Process Execution Language (BPEL). Business processes define workflows that generally include a variety of tasks. Typically, managing the collaborative sharing of information in a business enterprise system is difficult.

Networks such as the Internet provide the ability for geographically diverse systems to communicate with very low latency with other systems or individuals. Many enterprise systems once limited to enterprise intranets are now being deployed on the Internet to exploit available Web services. However, in doing so, effective implementation of a business process requires integration of even more diverse data and systems. As such, effective implementation of business processes is becoming even more complex.

Thus, it would be advantageous to provide a mechanism that facilitates enabling dynamic and adaptive business processes. It would be further advantageous to provide a mechanism for representing ontologies in a manner that facilitates efficient modification, adaptation, or transformation of a business process. It would be further advantageous to provide a mechanism that facilitates optimum selection of business sub-processes. It would be further advantageous to provide a mechanism that facilitates dynamic weighting of an onto-model. It would be further advantageous to provide a mechanism for weighting directed edges in an onto-model implemented as a directed graph enabling dynamic and adaptive business processes.

BRIEF SUMMARY OF THE INVENTION

The present invention provides a method, computer program product, and a data processing system that facilitates navigation through a directed graph for selection of sub-processes of a modified business process derived from a business process. A bounding box is used for evaluating and selecting sequences of nodes representative of business sub-processes or services. The bounding box has a predefined depth for limiting the scope of the evaluation. The bounding box is shifted during the evaluation as sequences of nodes are selected. Additionally, state data is maintained such that a sense response model may be employed to detect and account for changes to the environment in previously evaluated services. By maintaining state data, a transition to a previously evaluated sub-process may be implemented to account for significant changes in the environment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 13A and 13B are respective diagrammatic illustrations of an evaluation mechanism for selecting sub-processes of a business process in accordance with a preferred embodiment of the present invention.

DETAILED DESCRIPTION OF THE INVENTION

Figure 1:
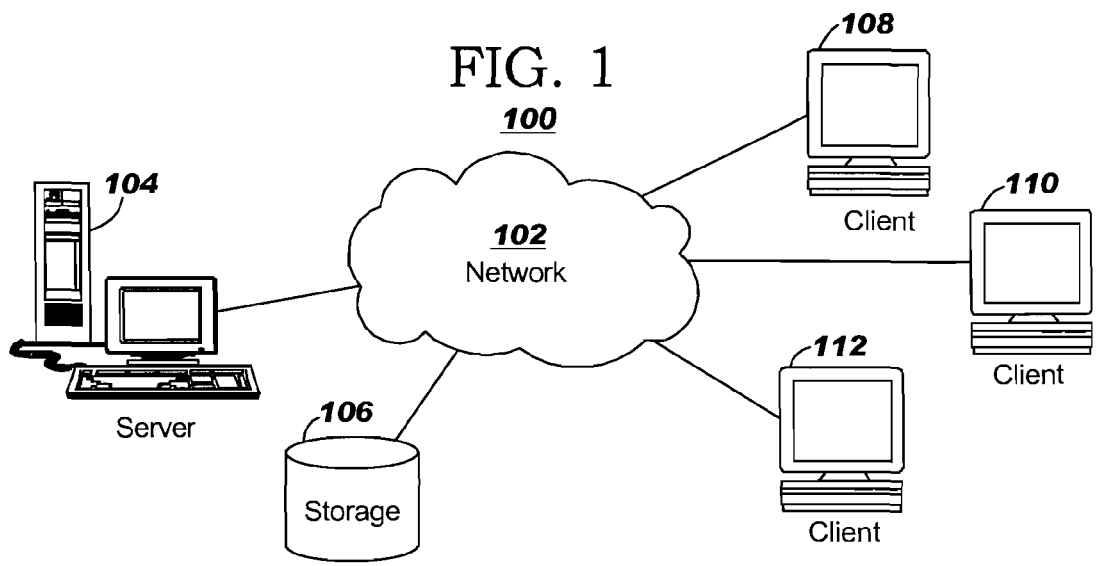
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
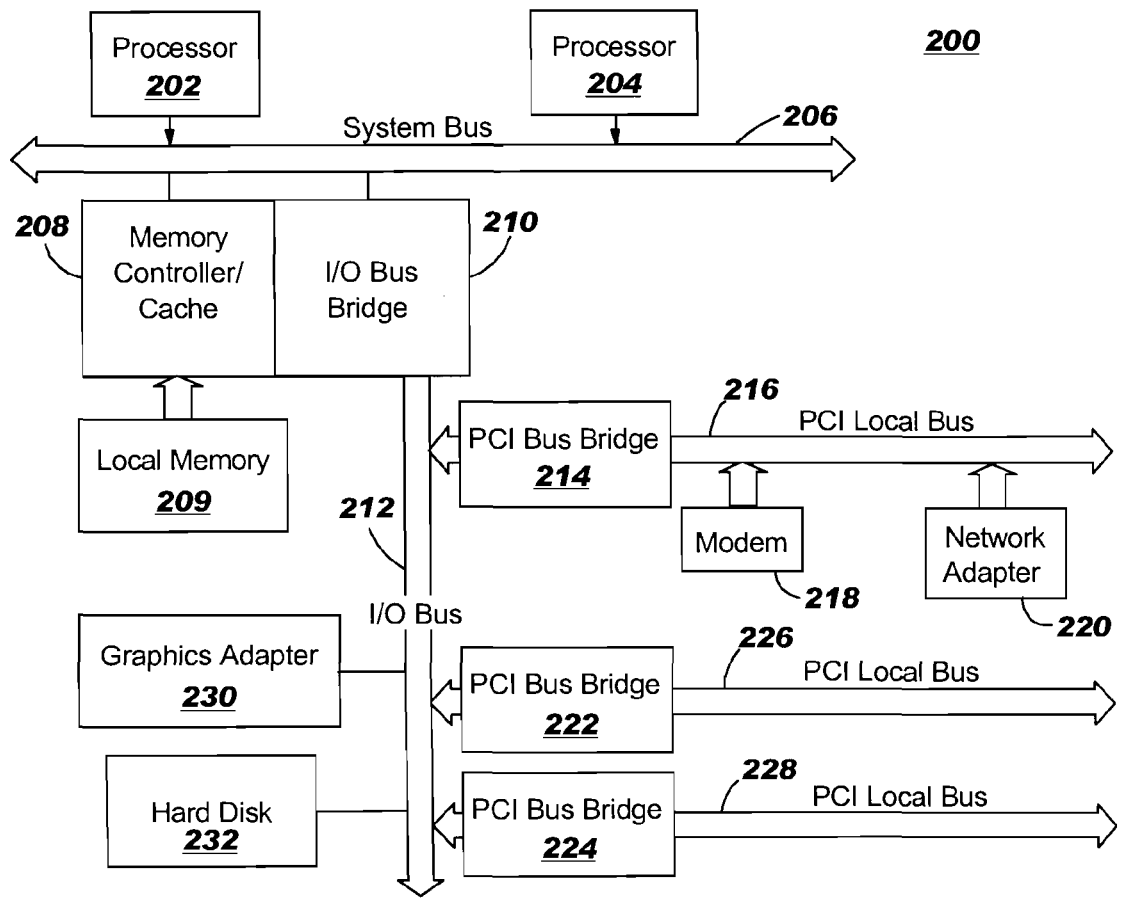
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
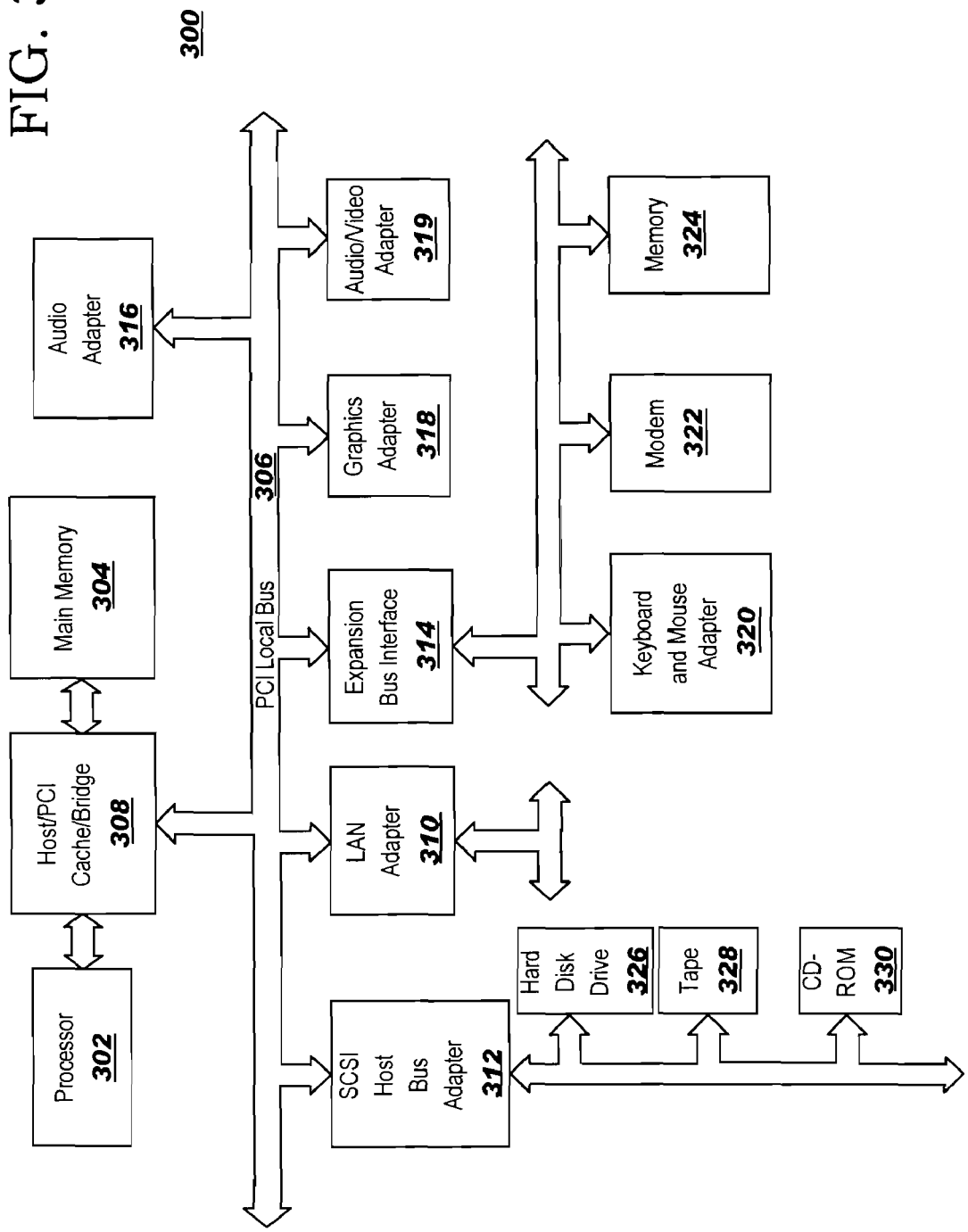
FIG. 3 is a block diagram illustrating a data processing system that may be implemented as a client in a network in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system. As another example, data processing system 300 may be a stand-alone system configured to be bootable without relying on some type of network communication interfaces. The depicted example in FIG. 3 and above-described examples are not meant to imply architectural limitations. For example, data processing system 300 also may be a notebook computer or hand held computer. Data processing system 300 also may be a kiosk or a Web appliance.

In accordance with a preferred embodiment of the present invention, a business process may be efficiently adapted or transformed. The business process may be represented, for example, by a BPEL template. An onto-model derived from ontologies is mapped against a business process template. The onto-model may be modified by contextual information at run-time that is not contained with the ontological data from which the onto-model is derived. A processing algorithm is applied to the onto-model to select preferred services of a business process. Particularly, a business process includes a plurality of variant sub-process sets. A modified business process is generated that includes a number of sub-processes, or services, respectively chosen for execution from variant sub-process sets by mapping the onto-model derived from an ontologies data store against the business process template. Selection of the particular sub-process variant is based on the generated onto-model. Thus, a "modified" business process is executed that comprises a one or more sub-processes selected from the sub-process variant sets. A mechanism for representing ontologies, e.g., relationships, that facilitates efficient exploitation for adapting, transforming to otherwise modeling a business process. Particularly, the present invention provides a mechanism for representing business service ontologies for modifying business processes. Ontological information is encapsulated in a light-weight form that can bye used to modifying a BPEL template.

In accordance with another embodiment of the present invention, a mechanism for weighting edges of a onto-model implemented as a directed graph is provided. Business sub-processes or services are represented as nodes in the directed graph. Directed edges connecting related services are weighted to provide a mechanism for evaluating the relative preference of related services. The graph is traversed to identify the most desired sub-processes to be executed in a business process.

Figure 4:
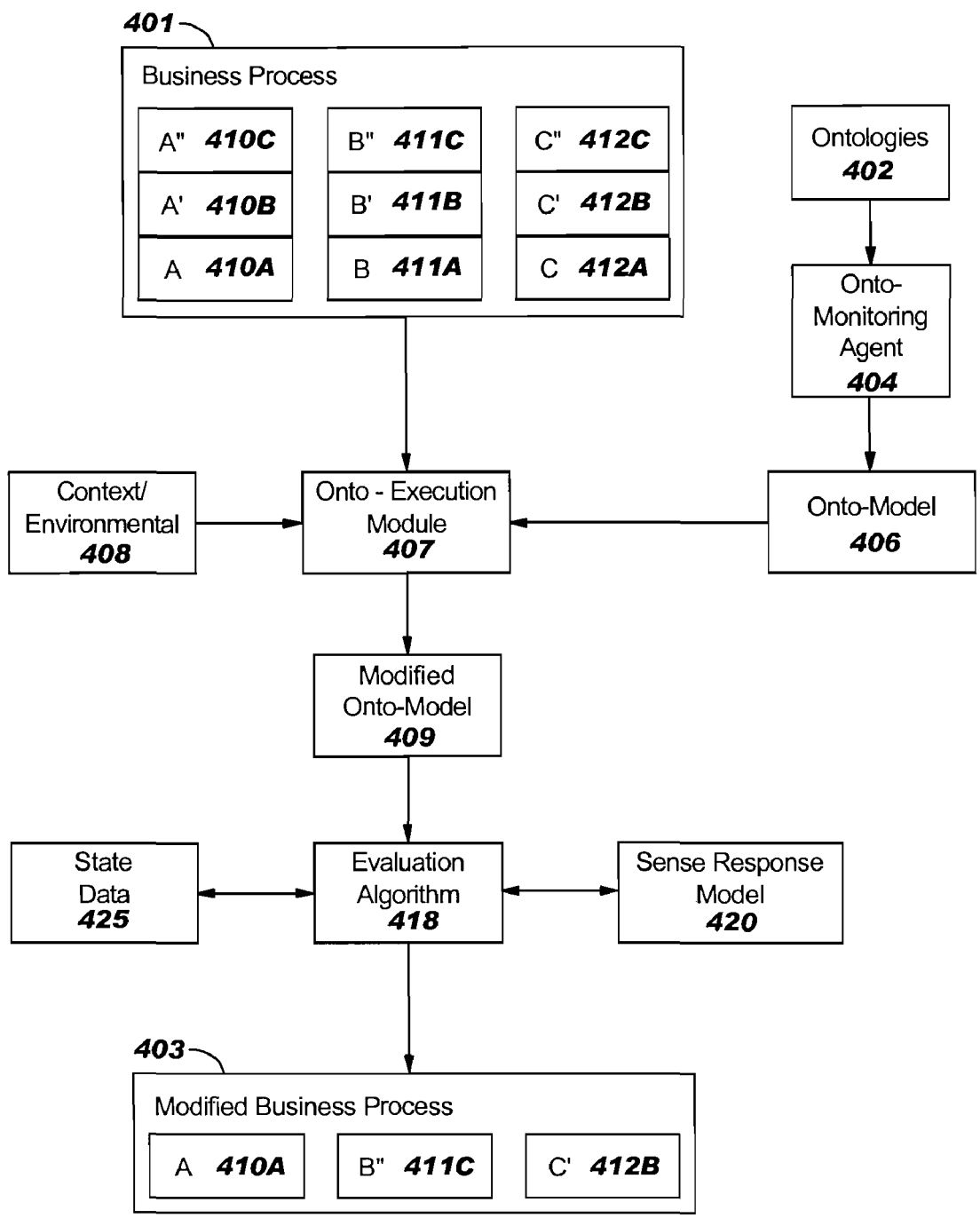
FIG. 4 is a diagrammatic illustration of a business process configuration in accordance with a preferred embodiment of the present invention.

With reference now to FIG. 4, a diagrammatic illustration of a business process configuration is shown in accordance with a preferred embodiment of the present invention. Business process 401 comprises a proprietary software language application or various integrated applications or may be implemented using an industry standard language, such as the Business Process Execution Language (BPEL). Business process 401 defines workflows that generally include a variety of tasks to perform enterprise processes. Business process 401 may be implemented using a platform independent standard, such as XML, that facilitates performing one or more business processes. Business process 401 defines more workflows, i.e., sub-processes, than those which will be executed during execution of the business process. In the illustrative example, business process 401 comprises various sub-processes 410a-412c, or services, that respectively define service workflows. Sub-processes of a sub-process variant set define related services that deviate in some manner by one another, for example required inputs, outputs produced, data formats on which the services operate, or the like. In the illustrative example, three sub-process variant sets 410-412 respectively comprising sub-processes 410a-410c, 411a-411c, and 412a-412c are shown.

At any given execution cycle of business process 401, a sub-process of a sub-process variant set may be executed while other sub-processes of the same sub-process variant set are not executed. Selection of a particular sub-process for execution may be made by various environmental, context, or other data. For example, a sub-process of a sub-process variant set may be selected over other sub-processes of the same sub-process variant set due to cost constraints, latency constraints, various performance criteria, or any other suitable environmental or context data that may be defined and against which evaluation of a business sub-process may be made.

An ontology store 402 defines ontologies, e.g., relationships such as required input/outputs, required for interactions among various business sub-processes, e.g., sub-processes of business process 401. Onto-monitoring agent 404 reads ontological data from ontology store 402 and generates onto-model 406 therefrom. Preferably, onto-model 406 comprises light-weight representations of ontologies defined in ontology store 402. Onto-model 406 is mapped to business process 401 for modifying business process 401 (or sub-processes thereof) at run time by onto-execution module 407. Onto-execution module reads the business process 401 and contextual or environmental data 408 and produces a modified onto-model 409 therefrom. Accordingly, onto-execution module 407 may make dynamic modifications to modified onto-model 409 at run time responsive to changes in contextual or environmental data 408. The modified onto-model is then supplied to one or more evaluation algorithms 418 for selecting business sub-processes. State data store 425 may record state data of different sub-processes to facilitate implementation of sense response model 420 as described more fully hereinbelow. Modified business process 403 is generated from the evaluation algorithm. As referred to herein, a modified business process comprises sub-processes of a business process wherein one or more sub-processes of the business process are selected from sub-process variant sets. In the illustrative example, a modified business process generated by mapping onto-model 406 to business process 401 comprises services 410a, 411c, and 412b.

Figure 5:
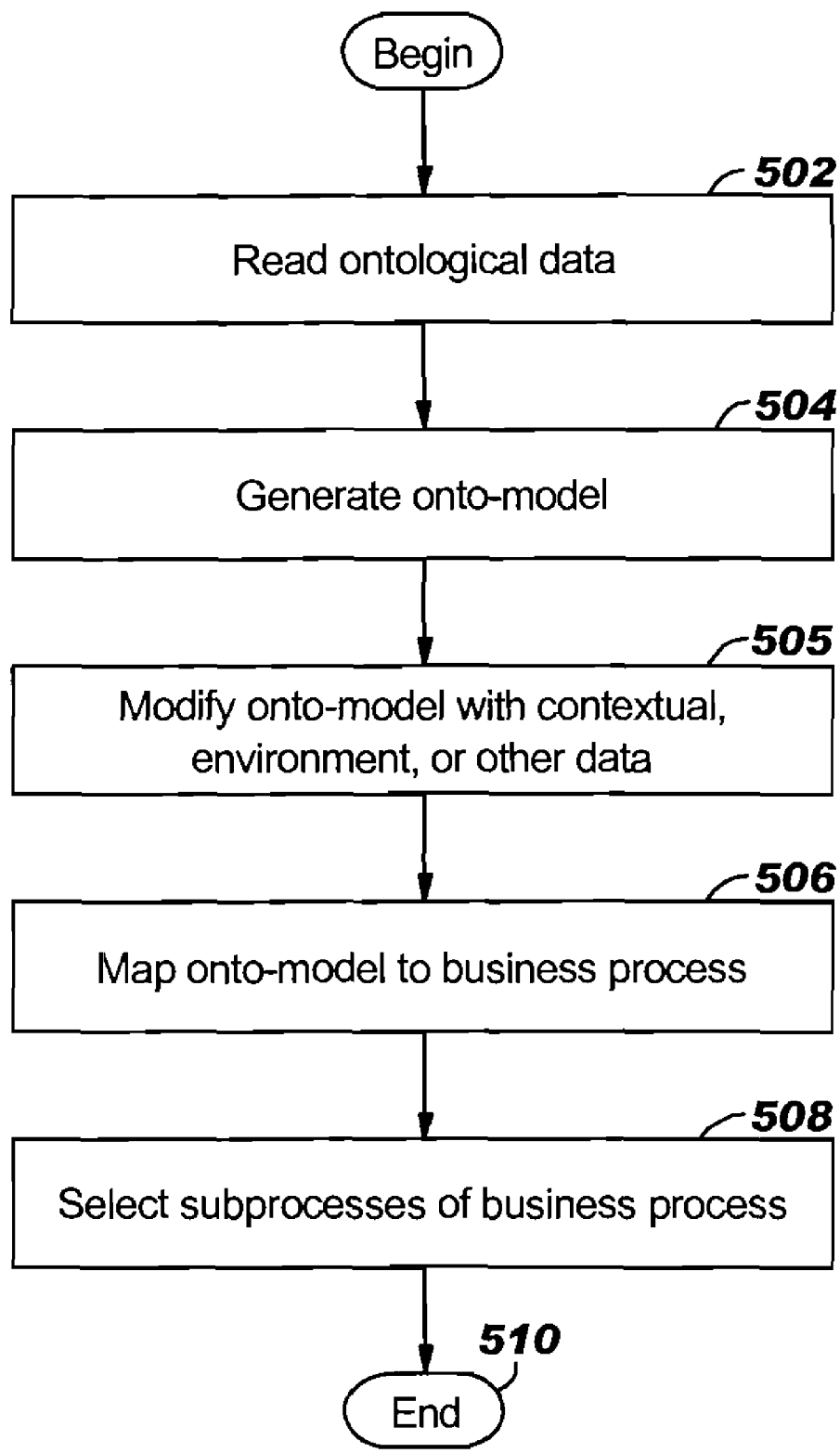
FIG. 5 is a flowchart of a business process flow selection routine in accordance with a preferred embodiment of the present invention.

With reference now to FIG. 5, a flowchart of a business process flow selection routine is shown in accordance with a preferred embodiment of the present invention. The business process flow selection routine is preferably implemented as one or more instruction sets that may be fetched from a memory device and executed by a processing unit, such as processor 202 shown in FIG. 2. The routine begins by reading ontological data (step 502), for example from ontology store 402 shown in FIG. 4. An onto-model is then generated from the ontological data read from the ontology store (step 504). For example, the onto-model may be generated as a directed graph. The onto-model may then be modified by contextual, environmental, or other data (step 505). The onto-model is then mapped to the business process (step 506). Sub-processes of the business process are then selected for execution based on the results of the ontological data mapped to the business process (step 508), and the business process flow selection routine then ends (step 510).

The processing steps shown in FIG. 5 may be performed by one or more different modules or applications at a central location in a network or they may be performed by one or more different modules or applications distributed at different processing nodes in a network of data processing systems. For example, the task of reading ontological data and generating an onto-model from the ontological data as described in steps 502 and 504 may be performed by onto-monitoring agent 404 shown in FIG. 4. The onto-monitoring agent may be implemented as a set of instructions executed by a processor of a data processing system that stores or interfaces with ontology store 404. The task of selecting the sub-processes of the business process may be performed by an evaluation algorithm implemented as a set of instructions executed by processor of another data processing system deployed in the network.

In accordance with a preferred embodiment of the present invention, onto-model 406 is preferably generated as a light-weight model derived from ontologies maintained in ontologies store 402. More specifically, light-weight onto-model 406 provides a mechanism for encapsulating ontological information, such as information about services and business processes, in a manner that facilitates modification of BPEL templates, such as business process 401 or sub-processes thereof, or for providing input such as representations to business process modeling applications.

Onto-model 406 may be implemented as a directed graph (or di-graph) that represents a business process, such as business process 401 shown in FIG. 4. Nodes of the generated graph are representative of services and directed edges, or links, of the graph connect related services. Links may be weighted to provide an indication of a preferred path, that is preferred services, through the di-graph. Thus, the onto-model implemented as a di-graph may be traversed using intelligent agents to determine preferred services or sub-processes of a business process.

Figure 6:
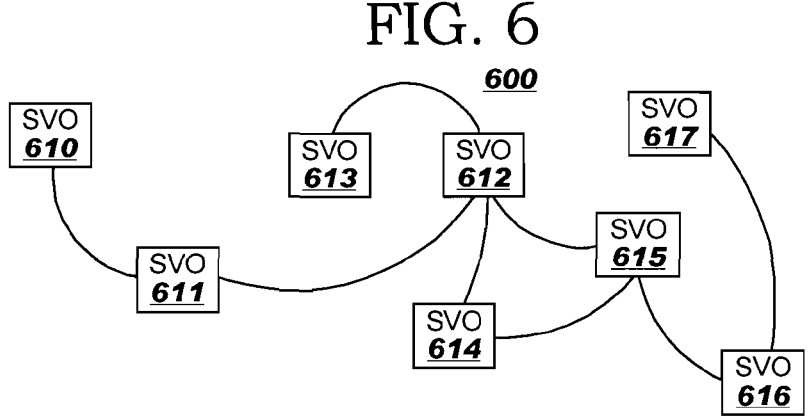
FIG. 6 is a diagrammatic illustration of a service as structured in accordance with a preferred embodiment of the present invention.

A service, such as business sub-process 410*a* shown in FIG. 4, can be defined as a collection of facts that contain a subject, verb, and object (SVO)—an entity also referred to as a resource description framework (RDF) triple. A collection of SVOs can be represented in a graphical form. FIG. 6 is a diagrammatic illustration of a service as structured in accordance with a preferred embodiment of the present invention. Service 600 is defined by a collection of SVOs 610-617. Service 600 is an example of one of sub-processes 410*a*-412*c* of business process 401 shown in FIG. 4, and as such can be encapsulated into an atomic service construct with inputs, outputs, preconditions, and effects. Accordingly, service 600 comprising a collection of SVOs may be encapsulated as a node of a directed graph that defines an onto-model as described more fully hereinbelow.

Figure 7:
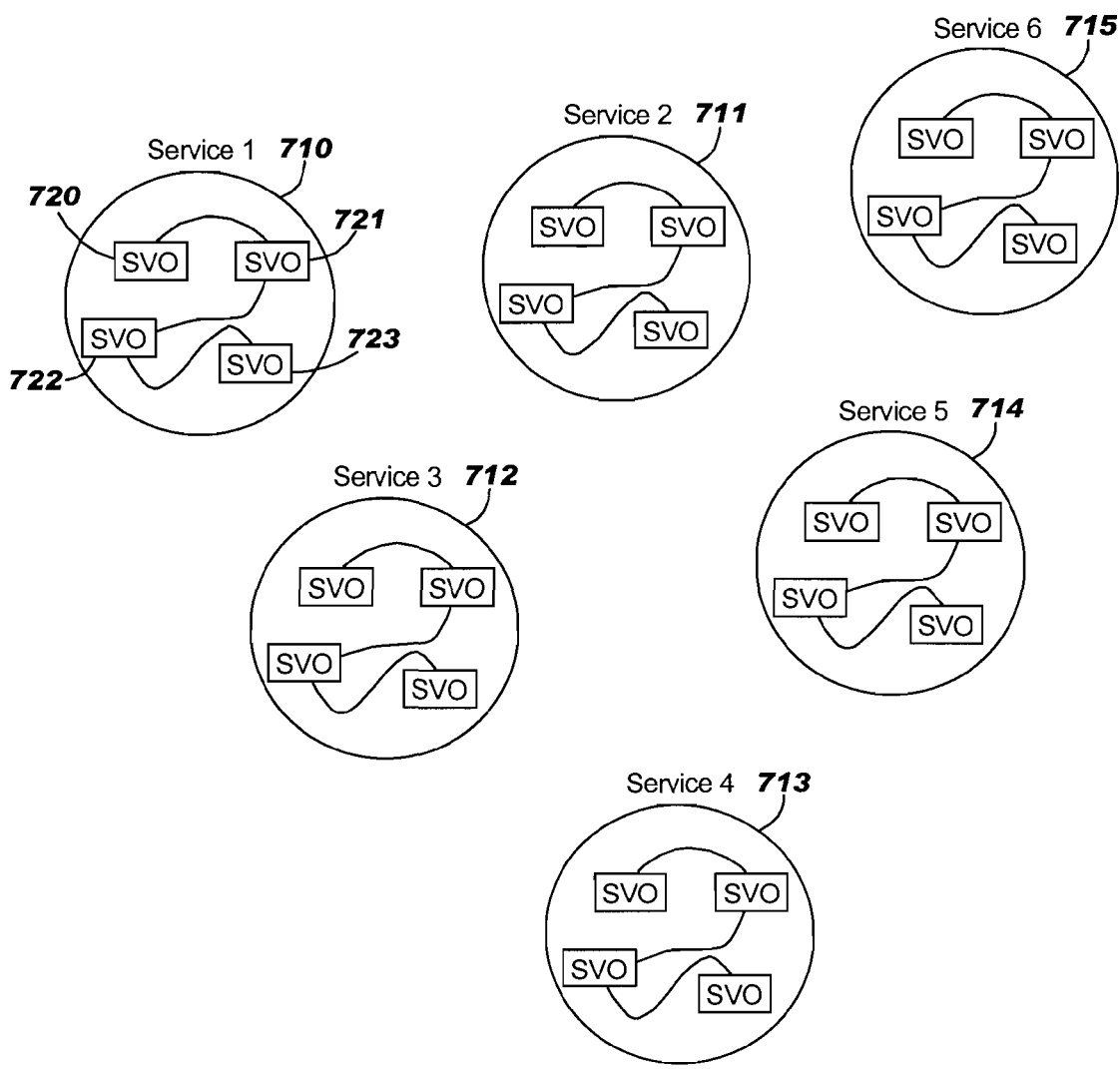
FIG. 7 is a diagrammatic illustration of a set of services implemented as encapsulated SVOs that facilitate generation of an onto-model in accordance with a preferred embodiment of the present invention.

FIG. 7 is a diagrammatic illustration of a set of services implemented as encapsulated SVOs that facilitate generation of an onto-model in accordance with a preferred embodiment of the present invention. Services 710-715 respectively comprise a collection of encapsulated SVOs. For example, service 710 comprises SVOs 720-723 encapsulated in a service construct. Each of services 720-723 define a business sub-process, such as one of business sub-processes 410*a*-412*c* of business process 401 shown in FIG. 4. Outputs and effects of one service, such as service 710, are implemented for compatibility with inputs and preconditions of another service with which the service may be linked. That is, outputs and effects of one service must describe the same concepts as inputs and preconditions of another service to facilitate linking of the services.

Figure 8:
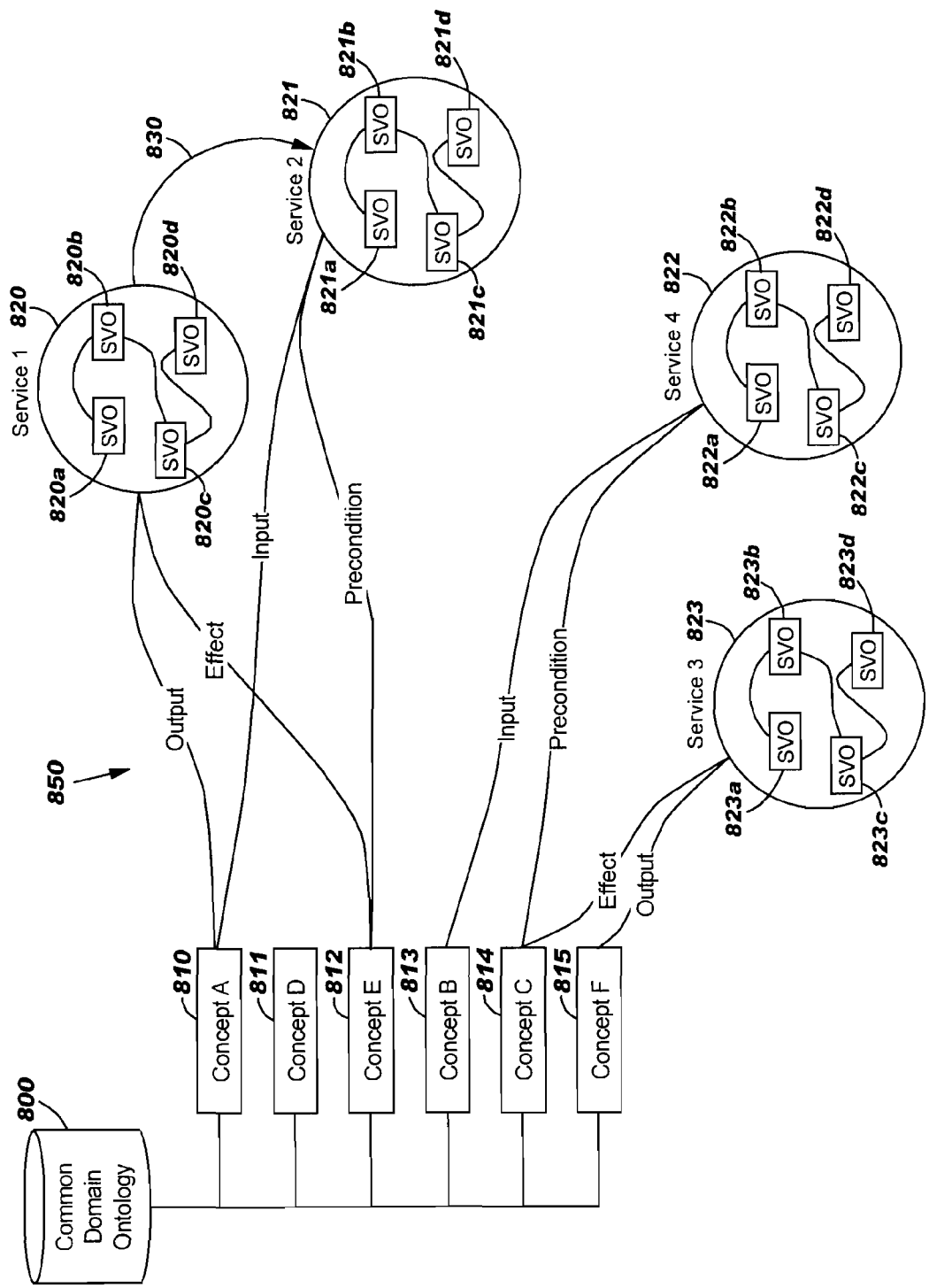
FIG. 8 is a diagrammatic illustration of an onto-model implemented as a directed graph generated from ontological data in accordance with a preferred embodiment of the present invention.

FIG. 8 is a diagrammatic illustration of an onto-model implemented as a directed graph generated from ontological data in accordance with a preferred embodiment of the present invention. Ontology data 800 is an example of ontological data maintained in ontology store 402 shown in FIG. 4. Various concepts 810-815 are defined that are descriptive of various service inputs, outputs, preconditions, and effects. Encapsulated services 820-823 are defined as a collection of SVOs and are respectively formatted similar to service 600 shown in FIG. 6. That is, each of services 820-823 comprises a collection of SVOs. Encapsulated services 820-823 may be stored in ontology store 402 shown in FIG. 4.

An intelligent agent, such as onto-monitoring agent 404 shown in FIG. 4, reads SVO collections of services that have been defined and that are stored in ontology store 402. In the illustrative example, onto-monitoring agent 404 shown in FIG. 4 reads each of the SVOs of services 820-823. Onto-monitoring agent 404 may, for example, identify SVOs of a particular service by identification of service SVO collections based on SVO namespaces. For example, onto-monitoring agent 404 may identify SVOs 820*a*-820*d* as belonging to service 820 by a common namespace assigned to SVOs 820*a*-820*d*. In a similar manner, onto-monitoring agent 404 respectively identifies SVOs 821*a*-821*d*-823*a*-823*d* as belonging to services 821-823.

In response to reading services 820-823, the onto-monitoring agent generates directed graph 850 from concepts 810-815 and services 820-823 by assembling links between services 820-823. For services to be linked, the output of a first service must describe the same concept as the input of a second service, and the effect of the first service must describe the same concept as the precondition of the second service. In the illustrative example, the onto-monitoring agent evaluates the output of service 820 as describing concept 810 and the effect of service 820 as describing concept 812. The onto-monitoring agent then evaluates other services to determine if service 820 may be linked with any other available services. For example, the onto-monitoring agent evaluates the input of service 821 as describing concept 810 and evaluates the precondition of service 821 as describing concept 812. Because the input of service 821 describes concept 810 and the precondition of service 821 describes concept 812, a link, for example a directed edge 830, is assembled connecting service 820 and 821. Particularly, service 820 is linked as a source node to service 821 as indicated by the arrow of directed edge 830 connecting service 820 with service 821. In this instance, service 721 is a destination node of the node pair comprising services 820 and 821. Other services 822 and 823 may be similarly evaluated to determine of they may be linked with service 820.

A service that doesn't have a correspondence between its output and effect with the input and precondition of another service are not linked. For example, the onto-monitoring agent respectively evaluates the input and precondition of service 822 as describing concepts 813 and 814. The onto-monitoring agent evaluates the effect and outputs of service 823 as describing concepts 814 and 815. Thus, service 822 may not be linked as a source node with service 823.

Figure 9:
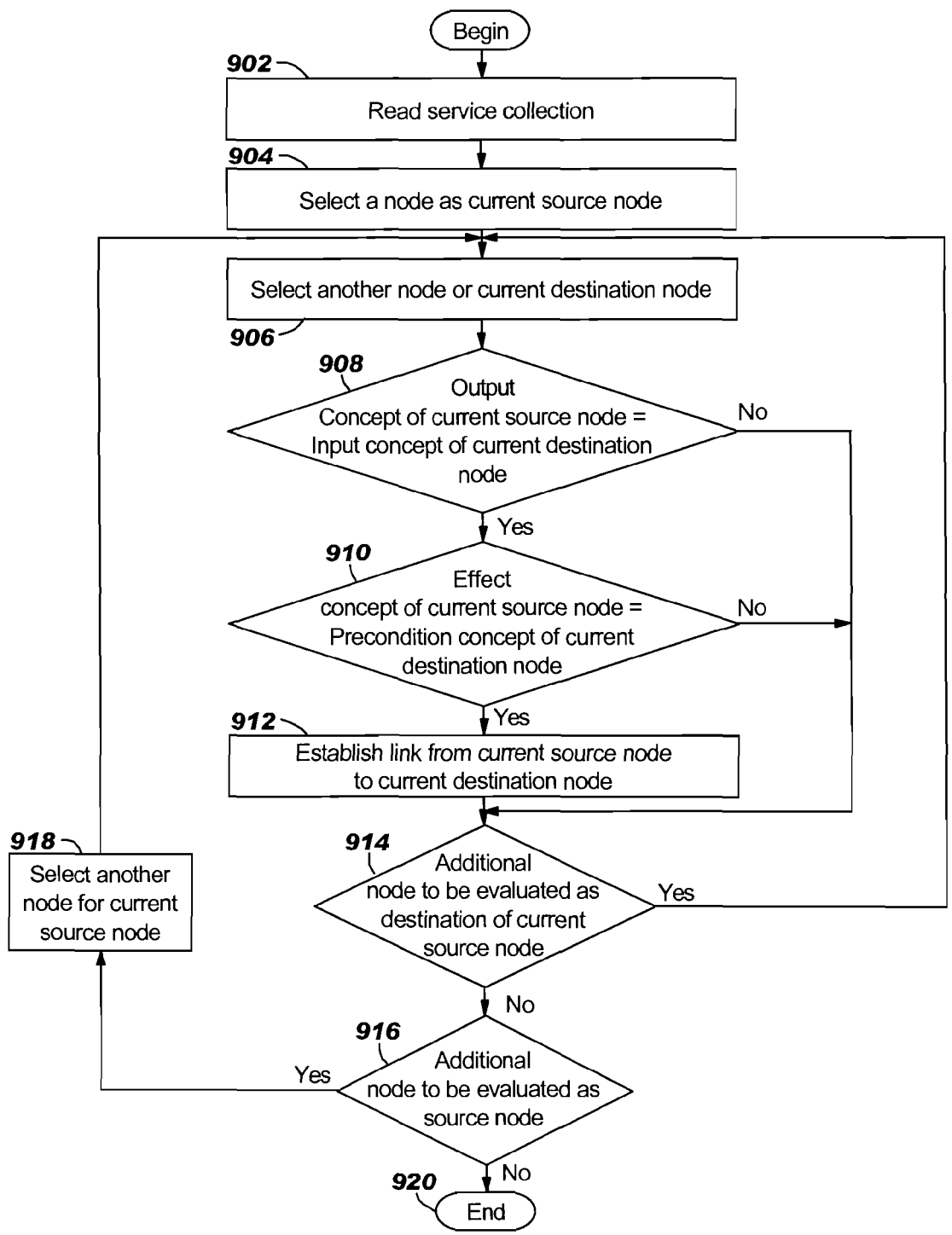
FIG. 9 is a flowchart of an onto-model generation procedure performed by an onto-monitoring agent in accordance with a preferred embodiment of the present invention.

FIG. 9 is a flowchart of an onto-model generation procedure performed by an onto-monitoring agent in accordance with a preferred embodiment of the present invention. The onto-monitoring agent is preferably implemented as a set of computer-executable instructions that are fetched from a memory store and executed by a processing unit, such as processor 202 shown in FIG. 2.

The onto-model generation procedure is invoked and a service collection is read by the onto-monitoring agent (step 902). The service collection comprises a set of services, such as services 820-823 shown in FIG. 8, each of which respectively comprises a collection of SVOs. The onto-monitoring agent then selects one of the nodes of the service collection as a current source node (step 904).

Another node different than the current source node is then selected by the onto-monitoring agent as a current destination node (step 906). An evaluation is then made to determine if the output concept of the current source node corresponds to the input concept of the current destination node (step 908). If the output concept of the current source node does not correspond to the input concept of the current destination node, the onto-monitoring agent proceeds to determine if any additional nodes remain to be evaluated as a destination node of the currently selected source node (step 914).

Returning again to step 908, if the output concept of the current source node corresponds to the input concept of the current destination node, and onto-monitoring agent then evaluates the effect concept of the current source node to determine if it corresponds to the precondition concept of the current destination node (step 910). If the effect concept of the current source node does not correspond to the precondition concept of the current destination node, the onto-monitoring agent proceeds to determine if any additional nodes remain to be evaluated as a destination node of the currently selected source node according to step 914.

Returning again to step 910, if the effect concept of the current source node corresponds to the precondition concept of the current destination node, the onto-monitoring agent proceeds to establish a link from the current source node to the current destination node (step 912), and the onto-monitoring agent then proceeds to determine if any additional nodes remain to be evaluated as a destination node of the current source node according to step 914.

If the onto-monitoring agent determines that an additional node remains to be evaluated as the destination node of the currently selected source node at step 914, the onto monitoring agent returns to step 906 and selects another node as the destination node of the currently selected source node. If the onto-monitoring agent determines that no other nodes remain to be evaluated as the destination node of the current source node at step 914, the onto-monitoring agent then evaluates the service collection to determine if any other nodes remain to be evaluated as a source node (step 916). If it is determined that another node remains to be evaluated as the source node, the onto-monitoring agent selects a remaining node as the current source node (step 918), and the onto-monitoring agent returns to step 906 to select another node different than the currently selected source node for evaluation as the destination node of the newly selected source node. If it is determined that no additional nodes remain to be evaluated as a source node at step 916, the onto-model generation procedure then exits (step 920).

Figure 10:
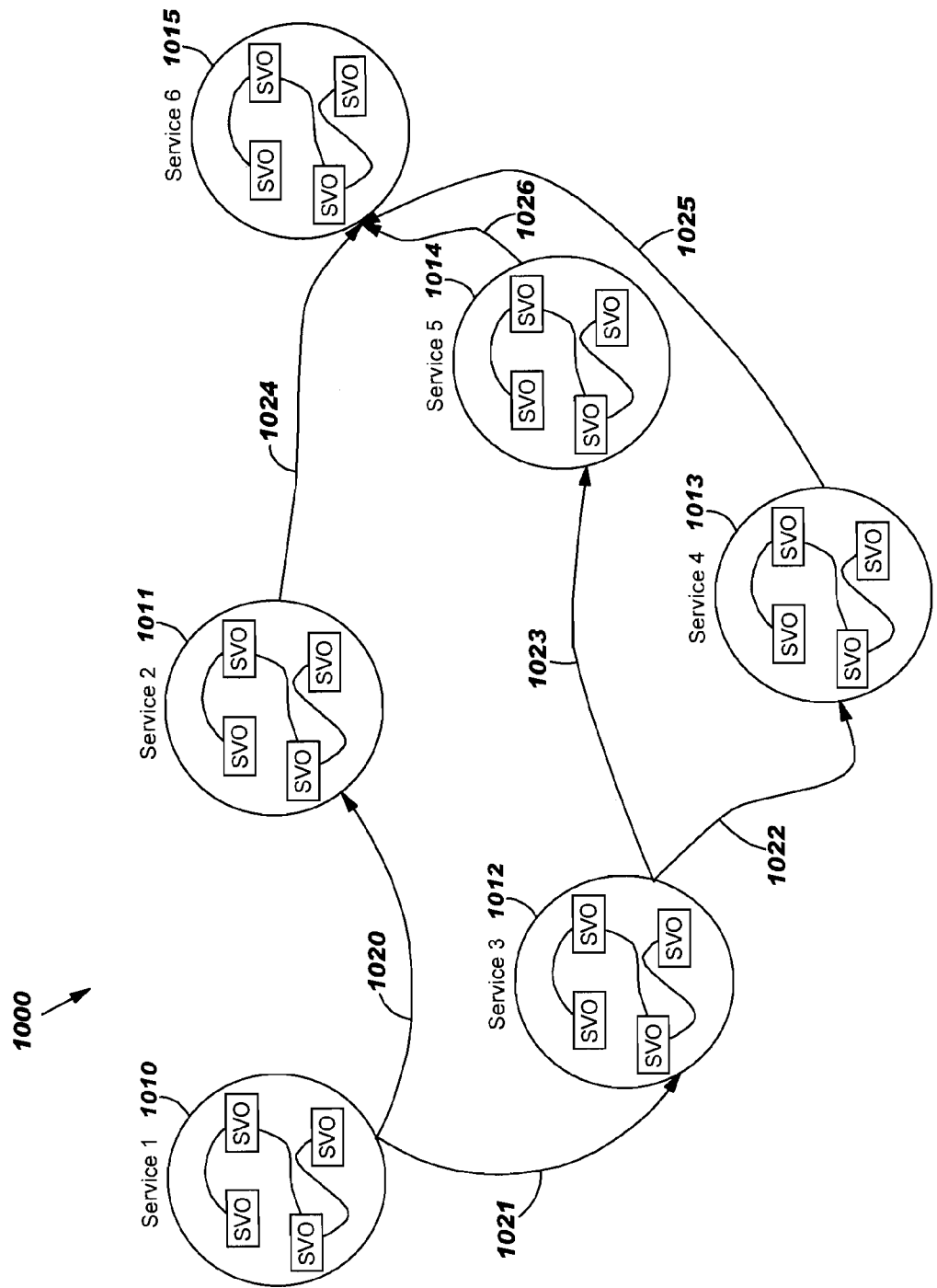
FIG. 10 is diagrammatic illustration of an onto-model generated as a directed graph from ontological data in accordance with a preferred embodiment of the present invention.

FIG. 10 is diagrammatic illustration of an onto-model generated as a directed graph from ontological data in accordance with a preferred embodiment of the present invention. Directed graph 1000 is preferably generated from ontological data of services according to the onto-model generation procedure described above with reference to FIG. 9. Directed graph 1000 comprises an onto-model of services implemented as nodes and relationships between services represented as directed edges. In the illustrative example, services 1010-1015 respectively comprise SVO collections. Directed edges 1020-1026 connect related services. For example, the output concept of service 1010 has been identified as corresponding to the input concept of both service 1011 and 1012, and the effect concept of service 1010 has been identified as corresponding to both the precondition concept of service 1011 and 1012. Accordingly, service 1010 is related to both services 1011 and 1012 and respective directed edges 1020 and 1021 link service 1010 as a source node of service 1011 and 1012.

In accordance with another embodiment of the present invention, edges of a directed graph that defines an onto-model are weighted to facilitate navigation of the onto-model for determining services in a business process to be executed. Weights assigned to edges of the directed graph provide a relative preference measure of services when identifying sub-processes of a business processes for execution.

Figure 11:
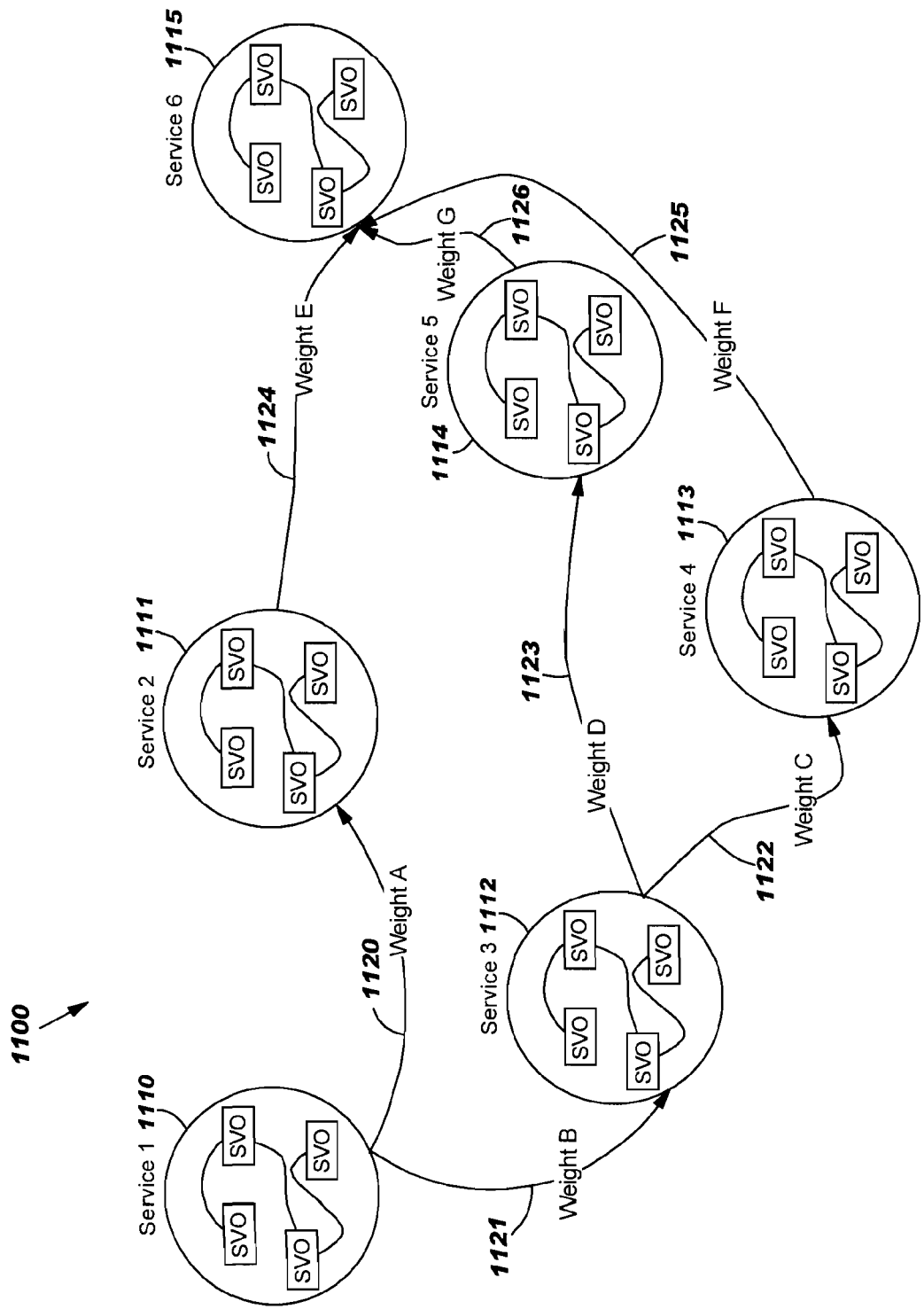
FIG. 11 is a diagrammatic illustration of an onto-model generated as a directed graph from ontological data having weighted edges in accordance with a preferred embodiment of the present invention.

With reference now to FIG. 11, a diagrammatic illustration of an onto-model generated as a directed graph from ontological data having weighted edges in accordance with a preferred embodiment of the present invention is shown. Directed graph 1100 comprises an onto-model of services implemented as nodes and relationships between services represented as directed edges. In the illustrative example, services 1110-1115 respectively comprise SVO collections. Directed edges 1120-1126 connect related services. For example, the output concept of service 1110 has been identified as corresponding to the input concept of both service 1111 and 1112, and the effect concept of service 1110 has been identified as corresponding to both the precondition concept of services 1111 and 1112. Accordingly, service 1110 is related to both services 1111 and 1112 and respective directed edges 1120 and 1121 connect service 1110 as a source node of service 1111 and 1112. In a similar manner, each of edges 1121-1126 link related services. Each of edges 1120-1126 are assigned a weight that defines a service preference. In the illustrative example, edges 1120-1126 are assigned respective weights of A-G.

In accordance with a preferred embodiment of the present invention, edge weights are determined by the current environment and the properties of each service. For example, constraints used to calculate edge weights may be quality, correlation between two services, and the like. The user may provide the onto-monitoring agent with an algorithm to assign weights, for example through a Java implemented interface or a rule set language, e.g., Agent Building and Learning Environment. Rules based inferencing, such as forward chaining, backwards chaining, pattern matching, and the like, may be leveraged for calculating edge weights.

Figure 12:
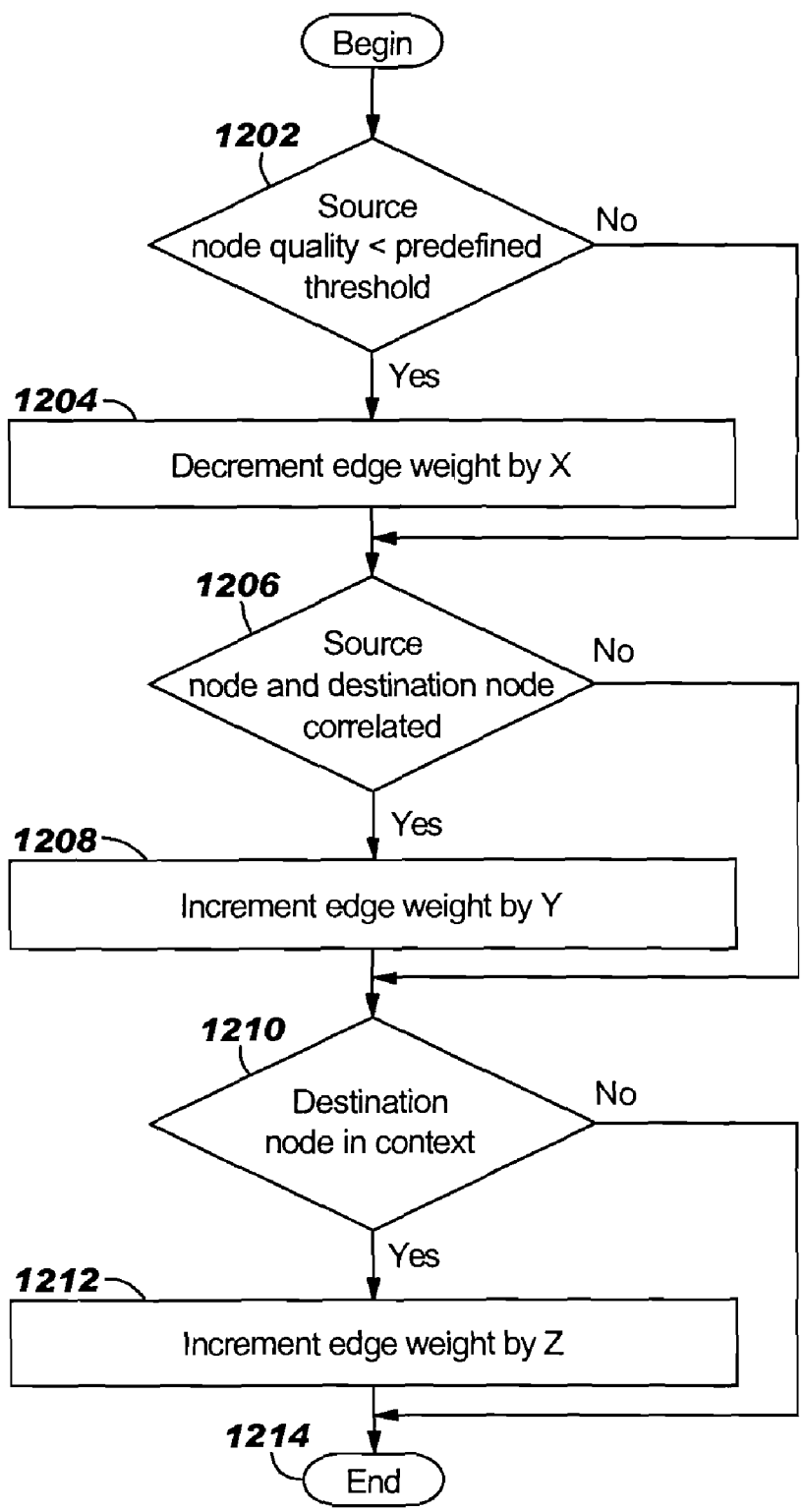
FIG. 12 is a flowchart of an exemplary edge weight calculation routine for determining weights of directed edges connecting services in a di-graph onto-model in accordance with a preferred embodiment of the present invention.

FIG. 12 is a flowchart of an exemplary edge weight calculation routine for determining weights of directed edges connecting services in a di-graph onto-model in accordance with a preferred embodiment of the present invention. The edge weight calculation routine may be implemented as a subroutine of the onto-monitoring agent and is preferably implemented as a set of computer-executable instructions that are fetched from a memory store and executed by a processing unit, such as processor 202 shown in FIG. 2.

The edge weight calculation routine begins by identifying a source node and a destination node that are linked (step 1201). A source node quality is then compared with a predefined threshold (step 1202). If the source node quality is less than the predefined threshold, the edge weight is decremented by a predefined value (X), and the edge weight calculation routine proceeds to determine if the source node and the destination node are correlated (step 1206). If it is determined at step 1202 that the source node quality is not less than the predefined threshold, the edge weight calculation routine proceeds to evaluate the source node and destination node for correlation therebetween according to step 1206.

If a correlation between the source node and the destination node is identified at step 1206, the edge weight calculation routine proceeds to increment the edge weight by a predefined value (Y), and the edge weight calculation routine proceeds to determine if the destination node is in the context (step 1210). If no correlation between the source node and destination node is identified at step 1206, the edge weight calculation routine proceeds to determine if the destination node is in the context according to step 1210.

If the edge weight calculation routine determines the destination node is in the context at step 1210, the edge weight is incremented by a predefined value (Z) (step 1212), and then exits (step 1214). Alternatively, if the destination node is not identified in the context at step 1210, the edge weight calculation routine then exits according to step 1214.

The particular evaluations shown in steps 1202, 1206, and 1210 for weighting a directed edge between a source node and a destination node are exemplary only, and other conditions and constraints may be substituted or used in addition to those evaluations shown. The particular evaluations for calculating edge weights are exemplary only and are chosen only to facilitate an understanding of the invention.

Once the edge weights have been calculated, an optimal traversal path may be determined through one or more known evaluation algorithms 418 shown in FIG. 4, such as Dijkstra's or Bellman-Ford algorithms, through proprietary graph algorithms, or another suitable graph algorithm. Evaluation algorithms 418 used for graph traversal may be changed to suit a particular business need if the algorithm will affect the optimal path that results. Additionally, a maximum flow/min cut theorem may be applied to assure that the chosen path is not only optimal but plausible. Moreover, additional heuristics may be applied to remove or avoid unwanted paths. For example, a breadth-first, heuristic depending approach may be applied to trim paths when the path reaches a certain threshold. Paths may be trimmed due to incompatibility with the path, the quality level of one or more nodes may be too low, excessive cost realized by choosing a particular path, or other criteria.

In a preferred embodiment of the present invention, a bounding box is produced that gradually shifts as the current node being evaluated changes. As referred to herein, a current node that is being evaluated is referred to as a focus node. Prior to determining which node in a path to traverse, an evaluating agent must update the information about the focus node. Updates are preferably made at runtime to assure that the data of the focus node being evaluated is the most up to date data available. The bounding box may be limited to a small set of nodes thereby consuming less memory and time updating information regarding the nodes.

As the bounding box is shifted, that is as new nodes are introduced into the bounding box and corresponding nodes that have been evaluated are shifted out of the bounding box, weights are assigned to the edges as they are removed from the bounding box. Service properties are updated when the corresponding service node is entered into the bounding box, and the newly updated information is used to apply the formula for calculating weights. Any node outside the bounding box is currently not within the evaluation scope and thus there is no need to assign a weight to these nodes. If any nodes that have previously been evaluated and are outside the bounding box, a monitoring agent may be used to monitor for these changes. Such a monitoring agent may be implemented as a subroutine of the onto-monitoring agent.

With reference now to FIG. 13A, a diagrammatic illustration of an evaluation mechanism for selecting sub-processes of a business process in accordance with a preferred embodiment of the present invention is shown.

Directed graph 1375 comprising nodes 1300-1310 representative of business process services is read, e.g., by evaluation algorithm 418 shown in FIG. 4. Related services are linked with directed edges 1320-1334 each assigned a respective weight (weights A-O) as described above. A start node is selected as a focus node to being the service evaluation. In the illustrative example, service node 1300 is a start node of directed graph 1375 and is selected as the focus node. Bounding box 1350 preferably has a predefined "depth" that limits the number of linked nodes to be evaluated during a bounding box evaluation cycle. In the present example, bounding box 1350 has a depth of 3. For example, a sequence of linked nodes included in bounding box 1350, such as node 1300, node 1301 and node 1303, does not exceed three nodes for any bounding box evaluation cycle.

The bounding box thus encompasses a set of nodes and edges from which related services are selected. The evaluation begins by selecting the start node as the focus node. Weights of edges originating from the start node are then evaluated. For example, weights of edges 1320 and 1321 that link focus node 1300 with respective service nodes 1301 and 1302 are evaluated. Based on the evaluation of the edge weights, one of service nodes 1301 and 1302 are selected. In the illustrative example, assume service node 1302 is selected. Accordingly, the evaluation then proceeds to evaluate edges 1324 and 1334 that respectively link service node 1305 and 1301 with service node 1302. In the illustrative example, assume service node 1305 is selected. Accordingly, the bounding box cycle is completed as the sequence of service nodes 1300, 1302, and 1305 has reached the bounding box depth limit of three. The sequence of selected services after the first bounding box evaluation cycle then comprises the service set {Service 1, Service 3, Service 6}.

Figure 13B:
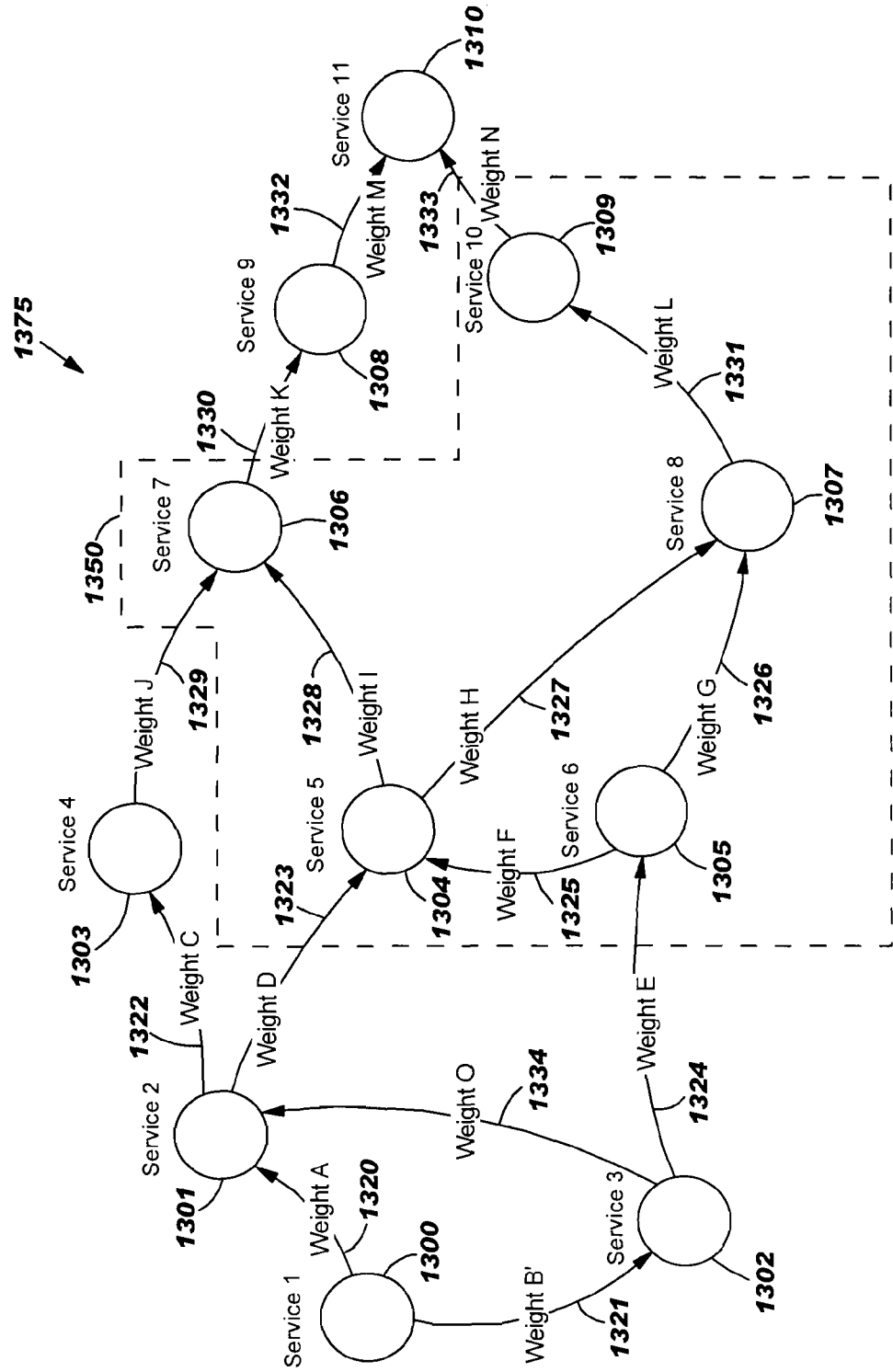

With reference now to FIG. 13B, a diagrammatic illustration of the bounding box sub-process selection routine for selecting sub-processes of a business process during a second bounding box evaluation cycle is shown in accordance with a preferred embodiment of the present invention. Once a bounding box evaluation cycle has completed, the bounding box is shifted such that the last selected node of the previous evaluation cycle is now the first node in the bounding box. In the present example, service node 1305 was the last node selected in the first bounding box evaluation cycle. Accordingly, bounding box 1350 is shifted such that service node 1305 is the first node from which the evaluation continues. Accordingly, the service nodes within the bounding box during the second evaluation cycle are limited to those nodes within two links of service node 1305. Thus, services nodes 1304-1307 and 1309 are included in bounding box 1350 during the second bounding box evaluation cycle.

The second bounding box evaluation cycle begins by evaluating weights of edges 1325 and 1326 that respectively link service node 1304 and 1307 with service node 1305. Assume for illustrative purposes that service node 1304 is selected based on the evaluation of edges 1325 and 1326. The second bounding box evaluation cycle proceeds by evaluating edges 1327 and 1328 that respectively link service nodes 1307 and 1306 with service node 1304. In the illustrative example, the second bounding box evaluation cycle completes upon selection of service node 1306. Thus, the sequence of selected services after the second bounding box evaluation cycle then comprises the service set {Service 1, Service 3, Service 6, Service 5, Service 7}. Another bounding box cycle may then commence by again shifting the bounding box such that the last service node selected during the second bounding box evaluation cycle is the first node in the bounding box for the subsequent bounding box evaluation cycle, and the procedure repeats in a similar manner until the directed graph has been fully traversed.

During evaluation of the nodes in bounding box 1350, the environment or properties (both of which are referred to herein as node "state" data) of a previously evaluated service node may change. These changes make the weightings assigned to edges originating or terminating at the service node out of date. To this end, sense response model 420 shown in FIG. 4 may be employed for monitoring changes on previously evaluated nodes. The monitoring agent, e.g., sense response model 420, determines if it is to notify the weight evaluating routine, e.g., evaluation algorithm 418 shown in FIG. 4. In the event that a notification is to be made, the notification is provided to the thread or application that evaluates weights and optimal paths.

An urgency level may be determined in a manner similar to the mechanism by which edge weights are determined by evaluating the current context and properties of the service. Through the means of an interface or a rule set, forward chaining may be used to calculate the aggregate urgency level. If the urgency level does not reach a pre-determined threshold, the change is ignored and the evaluating agent is not affected. If the change is significant, a notification is provided to the routine that evaluates edge weights. The monitoring agent, responsive to receiving the notification, then determines whether to ignore the notification or to re-evaluate the path that includes the previously evaluated node that has undergone a change in its state data.

To determine whether the path needs to be reevaluated, a threshold may be set that enables identification of the change in state data maintained in state data store 425 of a previously evaluated node as significant (and thus requiring a path reevaluation) or insignificant (in which case the change in state data may be ignored). If the change is identified as significant, the agent that is evaluating the weights is halted, and the agent, e.g., evaluation algorithm 418, is informed that it needs to return to the previously evaluated node for path reevaluation at the node. The path from the changed node is then reevaluated.

To assure that the evaluation routine doesn't enter a situation where repetitive reevaluations cause the evaluation routine to never complete identification of a path, a predefined time limit may be set on each node. After expiration of the predefined time limit, the effect of the changes in the node decrease and a decision to proceed to a next node in the path traversal is forced. Moreover, as the evaluation routine proceeds further into a path, changes in state data of previously evaluated nodes may be ignored (or given less consideration) relative to the distance of the node from the current focus node.

As described, embodiments of the present invention provide a mechanism for navigation through a directed graph for selection of sub-processes of a modified business process derived from a business process. A bounding box is used for evaluating and selecting sequences of nodes representative of business sub-processes or services. The bounding box has a predefined depth for limiting the scope of the evaluation. The bounding box is shifted during the evaluation as sequences of nodes are selected. Additionally, state data is maintained such that a sense response model may be employed to detect and account for changes to the environment in previously evaluated services. By maintaining state data, a transition to a previously evaluated sub-process may be implemented to account for significant changes in the environment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of traversing a directed graph for selecting services of a business process for execution, the method comprising the computer implemented steps of:

reading a directed graph comprising a plurality of nodes and plurality of edges, wherein each of the plurality of nodes is representative of a business service having inputs, outputs, preconditions, and effects, and each of the plurality of edges links two related nodes of the plurality of nodes, wherein two nodes are linked when outputs and effects of the service represented by one node are compatible with inputs and preconditions of the service represented by the other node, wherein each of the plurality of edges has a respective weight assigned thereto that defines a service preference;

responsive to reading the directed graph, selecting a first subset of the plurality of nodes, wherein the first subset includes a first start node;

responsive to selecting the first subset, traversing edges of the plurality of edges that link the start node with other nodes of the first subset by evaluating weights assigned to the edges;

selecting another node of the other nodes based on the evaluation;

responsive to selecting the another node, repeating the traversing step and the selecting another node step from the another node until a predefined number of nodes including a last node have been selected;

selecting a second subset of the plurality of nodes, wherein the second subset includes the last node;

repeating the traversing step and the selecting another node step for the second subset of the plurality of nodes beginning from the last node as a start node; and recording state data of each node encountered during the repeated traversing step.

2. The method of claim 1, wherein the first subset is selected by a bounding box construct having a depth equal to the predefined number.

3. The method of claim 1, wherein each selected node is identified in a record in sequence in which it is selected.

4. The method of claim 1, wherein each node of the directed graph comprises a resource description framework triple.

5. A computer program product comprising a computer readable storage medium having stored therein computer usable program code for traversing a directed graph for selecting services of a business process for execution, the computer usable program code, which when executed on a computer hardware system, causes the computer hardware system to perform:

reading a directed graph comprising a plurality of nodes and a plurality of edges, wherein each of the plurality of nodes is representative of a business service having inputs, outputs, preconditions, and effects, and each of the plurality of edges links two related nodes of the plurality of nodes, wherein two nodes are linked when outputs and effects of the service represented by one node are compatible with inputs and preconditions of the service represented by the other node, wherein each of the plurality of edges has a respective weight assigned thereto that defines a service preference;

responsive to reading the directed graph, selecting a first subset of the plurality of nodes, wherein the first subset includes a first start node;

responsive to selecting the first subset, traverse edges of the plurality of edges that link the start node with other nodes of the first subset by evaluating weights assigned to the edges;

selecting another node of the other nodes based on the evaluation;

responsive to selecting the another node, repeating the traversing step and the selecting another node step from the another node until a predefined number of nodes including a last node have been selected;

selecting a second subset of the plurality of nodes, wherein the second subset includes the last node;

repeating the traversing step and the selecting another node step for the second subset of the plurality of nodes beginning from the last node as a start node; and recording state data of each node encountered during the repeated traversing step.

6. The computer program product of claim 5, wherein the first subset is selected by a bounding box construct having a depth equal to the predefined number.

7. The computer program product of claim 5, further comprising:

each selected node is identified in a record in sequence of selection.

8. The computer program product of claim 5, wherein each node of the directed graph comprises a resource description framework triple.

9. A data processing system for traversing a directed graph for selecting services of a business process for execution, comprising:

a memory that contains an evaluation algorithm as a set of instructions that traverses and selects nodes representative of business process services in a directed graph; and a processor interconnected with the memory that, responsive to execution of the set of instructions, reads the directed graph comprising a plurality of nodes and a plurality of edges, wherein each of the plurality of nodes is representative of a business service having inputs, outputs, preconditions, and effects, and each of the plurality of edges links two related nodes of the plurality of nodes, wherein two nodes are linked when outputs and effects of the service represented by one node are compatible with inputs and preconditions of the service represented by the other node, wherein each of the plurality of edges has a weight assigned thereto that defines a service preference, selects a first subset of the plurality of nodes including a start node, traverses edges of the plurality of edges that link the start node with other nodes of the first subset by evaluating weights assigned to the edges, selects another node of the other nodes based on the evaluation, repeats the traversing step and the selecting another node step from the another node until a predefined number of nodes including a last node have been selected, and selects a second subset of the plurality of nodes that includes the last node, repeats the traversing step and the selecting another node step for the second subset of the plurality of nodes beginning from the last node as a start node, and records state data of each node encountered during the repeated step of traversing.

10. The data processing system of claim 9, wherein the first subset is selected by a bounding box construct having a depth equal to the predefined number.

11. The data processing system of claim 9, wherein each selected node is identified in a record in sequence in which it is selected.

\* \* \* \* \*